Aug. 23, 1932. A. J. WANNER 1,873,230
MECHANICAL MOVEMENT
Filed Feb. 9, 1931 4 Sheets-Sheet 2

Inventor
A. J. Wanner
By C. A. Snow & Co.
Attorneys.

Aug. 23, 1932.  A. J. WANNER  1,873,230
MECHANICAL MOVEMENT
Filed Feb. 9, 1931   4 Sheets-Sheet 3

Inventor
A. J. Wanner
By C A Snow & Co.
Attorneys.

Aug. 23, 1932.  A. J. WANNER  1,873,230
MECHANICAL MOVEMENT
Filed Feb. 9, 1931  4 Sheets-Sheet 4

Inventor
A. J. Wanner
By C. A. Snow & Co.
Attorneys.

Patented Aug. 23, 1932

1,873,230

UNITED STATES PATENT OFFICE

ALBERT JOHN WANNER, OF AKRON, OHIO, ASSIGNOR OF ONE-HALF TO CHARLES C. JACOBS, OF AKRON, OHIO

MECHANICAL MOVEMENT

Application filed February 9, 1931. Serial No. 514,593.

This invention aims to provide a novel means whereby rotation may be imparted from a driving shaft to a driven shaft, and to provide novel means whereby the direction of rotation of the driven shaft may be reversed.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 3 is a section on the line 3—3 of Figure 1;

Figure 5 is a sectional view taken on a slightly different plane from Figure 1 and showing the parts shifted from the position of Figure 1;

Figure 6 is a sectional view on the line 6—6 of Figure 10;

Figure 7 is a fragmental plan showing the means whereby one of the rotatable members is shifted laterally;

Figure 8 is a composite perspective view illustrating one of the slides and parts cooperating therewith;

Figure 1:
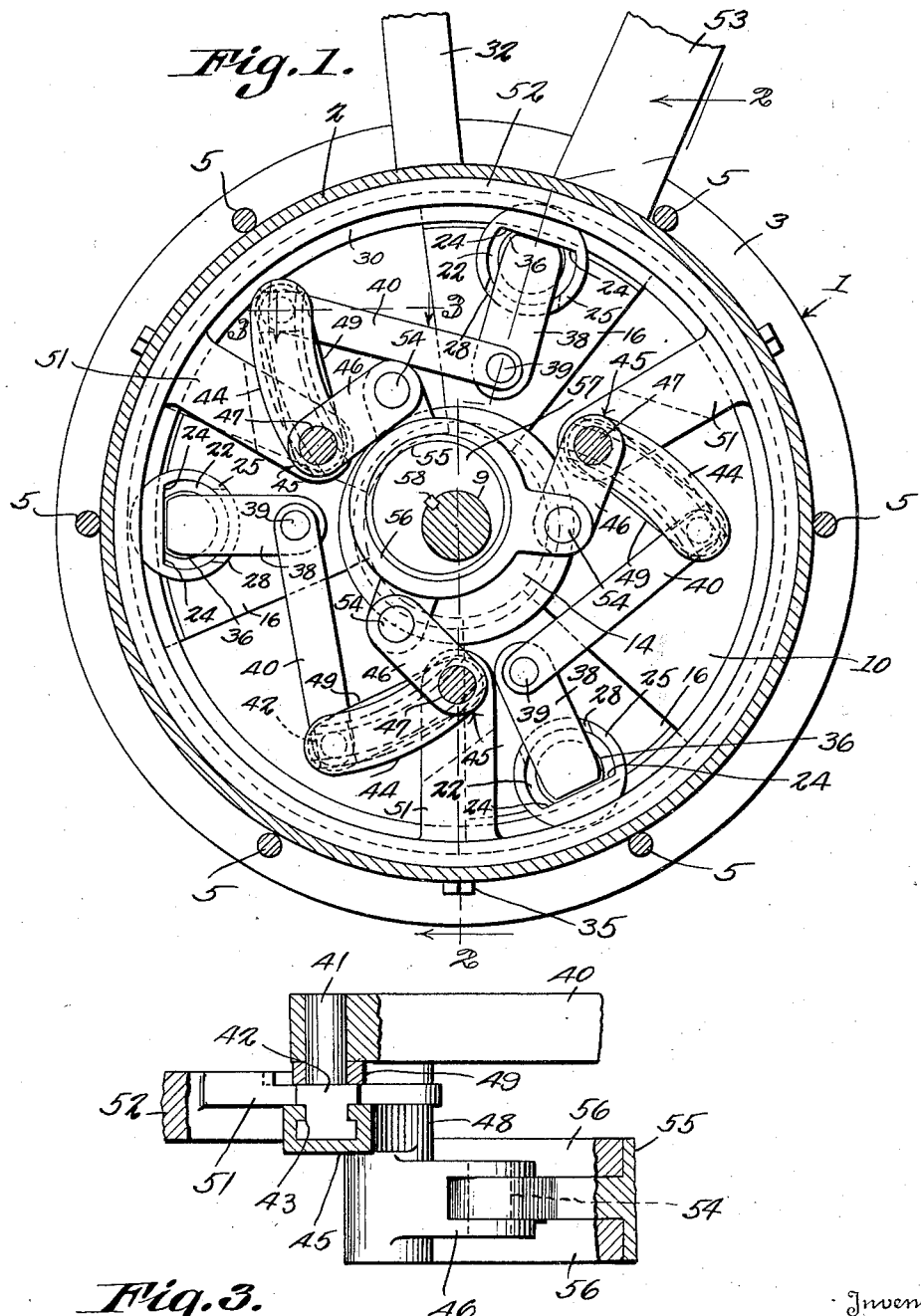
Figure 1 shows in vertical section, a device constructed in accordance with the invention.

The numeral 1 marks a fixed casing comprising a cylindrical shell 2 (Figures 1 and 2), and heads 3 and 4 held by securing elements 5 on opposite ends of the shell 2. The shell 2 has a circumferential slot 6 (Figures 9 and 2) and a circumferential slot 7 (Figures 5 and 2), the slot 6 being somewhat wider than the slot 7.

In the head 3 of the casing 1, a driven shaft 8 is journaled, a drive shaft 9 being journaled in the head 4. A driven member 10, in the form of a disc, turns in the casing 1 and is located adjacent to the head 3. At its periphery, the driven member 10 has an inwardly projecting rim 11. The driven member 10 is provided with a hub 12 which is secured to the driven shaft 8. A cup-shaped cap 14 is attached by securing elements 15 to the end of the hub 12.

Figure 9:
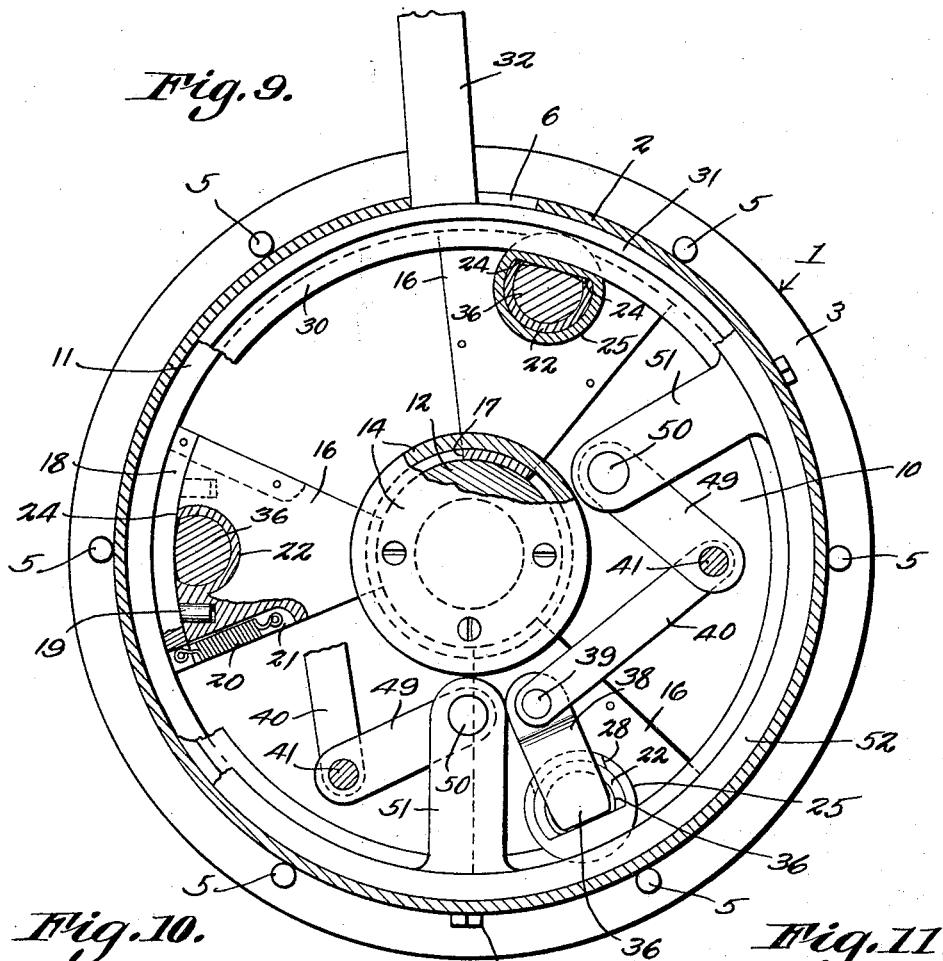
Figure 9 is a sectional view taken in a plane adjacent to the slides that operate the rotatable driven member.

The machine embodies a plurality of approximately triangular slides 16, shown in Figures 8, 9 and 1 of the drawings. The parts 16 are called slides because they have a reciprocating motion to the right and to the left in Figures 1, 9, 5, 10 and 11, parallel to and in contact with the driven disc 10. Comparing Figures 8 and 2, the drawings show that each slide is provided at its inner end with a laterally extended, curved flange 17 received between the hub 12 of the driven disc 10 and the rim of the cap 14, the construction being such that the slides 16 can move backwardly and forwardly, circumferentially of the hub 12, and, therefore, circumferentially of the driven shaft 8.

Figure 10:
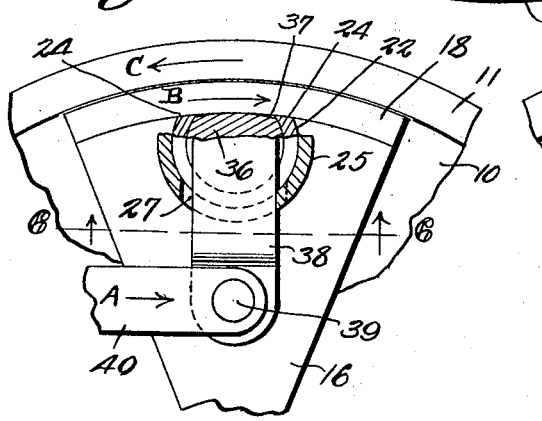
Figure 10 is an elevation showing the parts as they will appear when the slide is being moved in one direction, without imparting rotation to the driven member.
Figure 11:
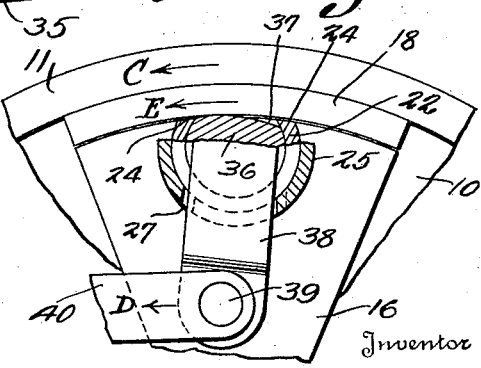
Figure 11 is a view like Figure 10, but illustrating the parts as they will appear when the slide is imparting rotation to the driven member.

At the outer end of each slide 16 there is an arcuate shoe 18 having radial movement, so that it can engage or release the rim 11 of the driven disc 10, as indicated in Figures 10 and 11. Pins 19 (Figure 9) on the shoe 18 slide in recesses in the member 16, and constrain the shoe 18 to a substantially radial in-and-out movement, the shoe 18 being drawn inwardly to the position of Figure 10 by pull springs 20 (Figures 9 and 6) located in recesses 21 in opposite edges of the slide 16, the springs being connected at their inner ends to the slide, and at their outer ends to the shoe 18.

Figure 2:
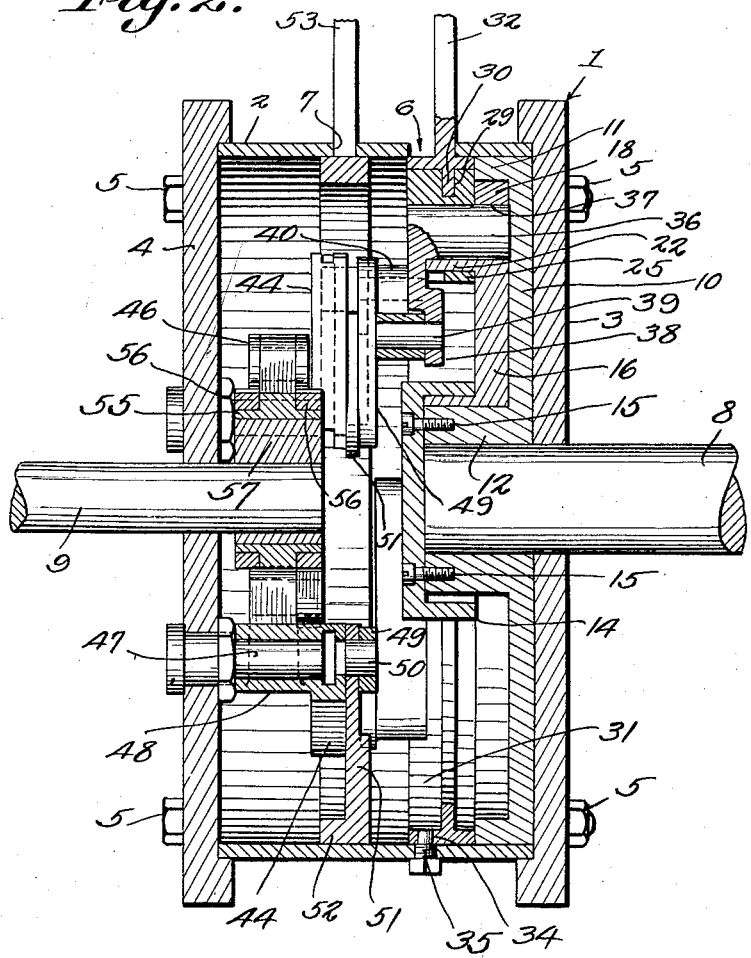
Figure 2 is a section on the line 2—2 of Figure 1.

It appears in Figure 8, in Figure 2 and in Figure 9, that inwardly projecting tubular bearings 22 are secured to the slide 16. Each bearing 22 is cut away at 23 to form flat edges 24. Around the bearings 22 are disposed collars 25, one of which is detailed in Figure 8. The collar 25 has a flat inner surface 26, which, cooperating with the flat edges 24 of the bearing 22, prevents the collar 25 from rotating on the bearing 22. The collar 25, however, can slide lengthwise of the bearing 22, that is, to the left, and to the right, from and to the position occupied by the collar 25 in Figure 2. Referring to Figures 6 and 8, the collar 25 has inner slots 27 and outer slots 28, the slots 27 being called the inner slots, because they are nearest to the median transverse plane of the machine in Figure 2. In the collars 25 there are transverse slots 29 shown in Figures 8 and 2.

In the slots 29 of the collars 25 is received an inwardly extended, circumferential fin 30, (Figures 2 and 1) on a ring or rotatable member 31 journaled within the shell 2 of the casing 1. The ring 31 has an arm 32 that sticks out through the slot 6 of the casing, as disclosed in Figures 2 and 9. Figure 7 makes it manifest, when considered in connection with Figure 2, that the ring 31 is provided with an inclined slot 34, located diametrically opposite to the arm 32, and into this slot extends a projection 35, such as the smooth end of a screw which is threaded into the shell 2 of the casing. Within the bearings 22, shafts 26 are mounted for rocking movement, the shafts having cams 37 (Figures 10 and 11) which shove out the shoes 18, against the action of the springs 20 of Figure 9, and cause the shoes to grip the rim 11 of the driven disc 10. The cam shafts 37 are provided with arms 38 (Figures 8, 5 and 2). Sometimes the arms 38 move in the inner slots 27 of the collars 25 (Figure 8) and sometimes they move in the outer slots 28, a statement which will be more intelligible when the description of the operation of the machine is taken up.

There are pivot elements 39 on the arms 38 of the cam shafts 36, and on the pivot elements 39 are mounted links 40 (Figures 5, 9, 11 and 10). The links 40 are pivoted on studs 41 (Figures 4 and 3) carried by riders 42 mounted at 43 to slide lengthwise of the arms 44 of bell crank levers 45, including arms 46, the bell crank levers being fulcrumed at 48 (Figures 4 and 3) to swing on studs 47 (Figure 2) that project inwardly from the head 3 of the casing 1.

Links 49 (Figures 9, 1 and 3) are mounted at one end on the studs 41 of the riders 42, pivotally, and at their opposite ends, the links 49 are pivoted at 50 (Figure 9) to posts 51 which project inwardly from a rotatable member or ring 52 (Figures 1 and 2) journaled within the shell 2 of the casing 1, and having an arm 53 (Figures 5 and 2) which extends outwardly through the slot 7 of the shell 2 of the casing.

Referring to Figures 5 and 2, in connection with Figure 3, the arms 46 of the bell crank levers 45 are pivoted at 54, severally, to a main eccentric strap 55, and to auxiliary eccentric straps 56 which turn around the main eccentric strap 55. All of the eccentric straps 55 and 56, however, respond to an eccentric 57, on which the main strap 55 is operatively mounted, the eccentric 57 being secured at 58 (Figures 1 and 5) to the driving shaft 9 that is journaled in the head 4 of the casing 2, as shown in Figure 2.

When the shaft 9 is rotated, the eccentric 57 is rotated, and the straps 55 and 56 tilt the bell crank levers 45, in sequence, on their fulcra 47. The riders 42 are held in adjusted positions along the arms 44 of the bell crank levers 45, by the links 49 that are connected to the studs 41 of the riders 42 and to the posts 51 of the shift ring 52. The arms 44 of the bell crank levers 45 operate the links 40 by way of the pivot studs 41, and swing the arms 38 of the shafts 36.

Suppose that the arm 38 is movable in the slot 27 of the collar 25, it being recalled that the collar cannot rotate on the bearing 22, owing to the engagement between the collar and the bearing at 26—24. Referring to Figure 10, suppose that the thrust of the link 40 is in the direction of the arrow A. The arm 38 is swung to the right in Figure 10, and the shaft 36 is rotated counter-clockwise. The arm 38, however, abuts against the collar 25 at the right hand end of the slot 27, before the shaft 36 has been rotated counter-clockwise far enough to cause the cam 37 to advance the shoe 18 against the rim 11 of the driven member 10, the shoe being held withdrawn from the rim 11, by the action of the springs 20. The result is that the slide 16 will be swung by the link 40, in the direction of the arrow B, without imparting rotation to the driven member 10.

When a pull is exerted on the link 40, as indicated by the arrow D in Figure 11, then the arm 38 can swing in the slot 27 and the shaft 36 can rotate far enough so that the cam 37 will cause the shoe 18 to grip the rim 11 of the driven member 10, and as the slide 16 is swung by the link 40, to the left in Figure 11, in the direction of the arrow E, the driven member 10 will be rotated in the direction of the arrow C. All of the slides 16 and attendant parts are never in the position of Figure 10, at one time, and, consequently, rotation in the direction of the arrow C is always being imparted to the member 10, one or more of the shoes 18 always being in the gripping position of Figure 11, and one or more of the shoes always being in the released position of Figure 10.

Suppose that it is desired to turn the member 10 in a direction opposite to that indicated by the arrow C in Figures 10 and 11. Such a reversal is brought about as follows:

Through the instrumentality of the arm 32, the ring 31 may be rotated. When the ring is rotated, it is moved transversely, because of the slot and projection construction 34—35 of Figures 7 and 2, and when the ring 31 is moved transversely, the collar 25 is slid lengthwise of the bearing 22, because the fin 30 of the ring 31 is engaged in the slot 29 of the collar 25, as shown in Figure 2. When the collar 25 is slid in the direction of its length, as aforesaid, the arm 38 of the cam shaft 36 is permitted to operate in the slot 28 of the collar 25. Because the slot 28 is offset circumferentially of the collar 25 with respect to the slot 27, a reversal of the operation shown in Figure 10 takes place, a corresponding reversal in the direction of rotation of the driven member 10 resulting. When the slot 28 comes into play, the arm 38 can swing to the right in Figure 10, in the slot 28, far enough so that the cam will cause the shoe 18 to bind on the flange 11 of the driven member 10. Similarly, in Figure 11, when the slot 28 comes into play, the arm 38 cannot swing so far to the left, but is stopped by engagement with the collar 25 at the left hand end of the slot 28 in Figure 8, the shoe 18 then being held retracted by the springs 20, with respect to the flange 11 of the driven member 10.

Figure 4:
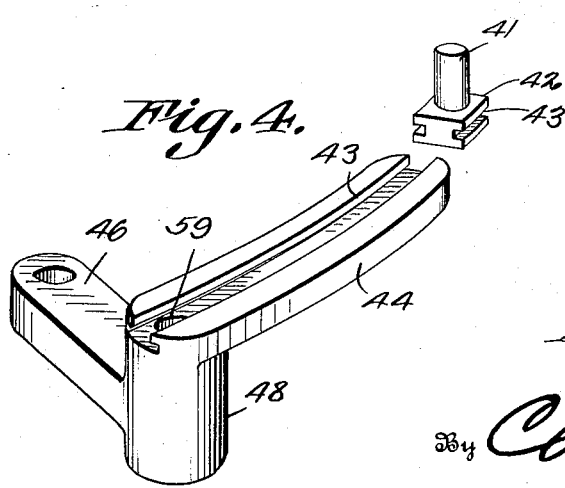
Figure 4 is a composite perspective view of the bell crank lever and the slide which cooperates with it.

By means of the arm 53, the ring 52 may be rotated, and the posts 51 on the ring will cause the links 49 to move the slides 42 of Figure 4 in or out along the arms 44 of the bell crank levers 45. In this way, the throw of the bell crank levers 45 may be regulated, and the speed of rotation of the driven member 10 adjusted. It is clear that if the riders 42 are slid along the arms 44 of the bell crank levers 45, until the pivot studs 41 on the rider are in coaxial relation with respect to the holes 59 (Figure 4) in which the fulcrum studs 47 (Figure 21) of the bell crank levers 45 are received, then no motion will be imparted to the bell crank levers, and the driven member 10 and the shaft 8 will be at rest.

Having thus described the invention, what is claimed is:

1. In a device of the class described, a driven member mounted to rotate about an axis, a slide mounted on the driven member to swing about said axis, a shoe movably mounted on the slide, a bearing carried by the slide, a shaft journaled in the bearing and having a cam cooperating with the shoe to advance the shoe and cause it to grip the driven member, an arm on the shaft, a collar held on the bearing against rotation, but movable longitudinally of the bearing, the collar having communicating, circumferentially-offset abutment slots for the reception of the arm, means for moving the collar to cause either of the slots to receive the arm and afford an abutment therefor, and means for operating the arm, to actuate the cam, set the shoe on the driven member, and rotate the driven member.

2. In a device of the class described, a driven member mounted to rotate about an axis, a slide mounted on the driven member to swing about said axis, a shoe movably mounted on the slide, a bearing carried by the slide, a shaft journaled in the bearing, means cooperating with the shaft and the shoe to advance the shoe and cause the shoe to grip the driven member, an arm on the shaft, a collar held on the bearing against rotation, but movable longitudinally of the bearing, the collar having communicating, circumferentially-offset abutment slots for the reception of the arm, a ring supported for rotation, means for rotating the ring, means for moving the ring transversely when it is rotated, inter-engaging elements on the ring and on the collar for moving the collar, when the ring is moved transversely, thereby to cause either of the slots to receive the arm and afford an abutment therefor, and means for operating the arm, to set the shoe on the driven member, and to rotate the driven member.

3. In a device of the class described, a driven member mounted to rotate about an axis, slides mounted on the driven member to swing about said axis, shoes movably mounted on the slides, bearings carried by the slides, shafts journaled in the bearings and having cams cooperating with the shoes to advance the shoes and cause them to grip the driven member, arms on the shafts, collars held on the bearings against rotation, but movable longitudinally of the bearings, the collars having communicating, circumferentially-offset abutment slots for the reception of the arms, means for moving the collars to cause either of the slots to receive the corresponding arm and afford an abutment therefor, and means for operating the arms, in sequential order, thereby to actuate the cams one after another, set the shoes on the driven member one after another, and impart continuous rotation to the driven member.

4. In a device of the class described, a casing, a drive member journaled on the casing, an eccentric on the drive member, a strap cooperating with the eccentric, a bell crank lever fulcrumed on the casing, means for connecting one arm of the bell crank lever with the eccentric, a rider shiftable along the other arm of the bell crank lever, a driven member journaled for rotation with respect to the casing, intermittently-acting mechanism for rotating the driven member, means for connecting said mechanism to the rider, a ring arranged concentrically with respect to the drive member and held for rotation by and within the casing, and a link connecting the ring with the rider, to shift the rider and the bell crank lever.

5. In a device of the class described, a casing, a driven member rotatable with respect to the casing, a slide mounted on the driven member to swing about the axis of rotation of the driven member, a shoe movably mounted on the slide, a bearing carried by the slide, a shaft journaled in the bearing, means cooperating with the shaft and the shoe to advance the shoe and cause the shoe to grip the driven member, an arm on the shaft, a collar held on the bearing against rotation, but movable longitudinally of the bearing, the collar having communicating, circumferentially-offset abutment slots for the reception of the arm, means for moving the collar to cause either of the slots to receive the arm and afford an abutment therefor, a drive member journaled on the casing, an eccentric on the drive member, a strap cooperating with the eccentric, a bell crank lever fulcrumed on the casing, means for connecting one arm of the bell crank lever with the eccentric, a rider shiftable along the other arm of the bell crank lever, a connection between the rider and the arm of the shaft, and means for shifting the rider on the bell crank lever.

6. In a device of the class described, a casing, a drive member journaled on the casing, an eccentric on the drive member, a strap cooperating with the eccentric, a bell crank lever, a fulcrum element on the casing and carrying the bell crank lever, a link pivoted to one arm of the bell crank lever and to the strap, a rider shiftable along the other arm of the bell crank lever, a pivot element on the rider, a driven member journaled for rotation with respect to the casing, intermittently-acting mechanism for rotating the driven member, and including an arm, a link pivoted to the last-specified arm and carried by the pivot element, and means for shifting the rider on the bell crank lever to bring the pivot element into and out of coaxial relation with respect to the fulcrum element, said means embodying a ring arranged concentrically with respect to the drive member, about the bell crank lever, and journaled in the casing, means for moving the ring circumferentially, a link mounted on the pivot element of the rider, and means for connecting the link to the ring for pivotal movement.

In testimony that I claim the foregoing as my own, I have hereto affixed my signature.

ALBERT JOHN WANNER.